Richd Yeoman's Combination Rack.
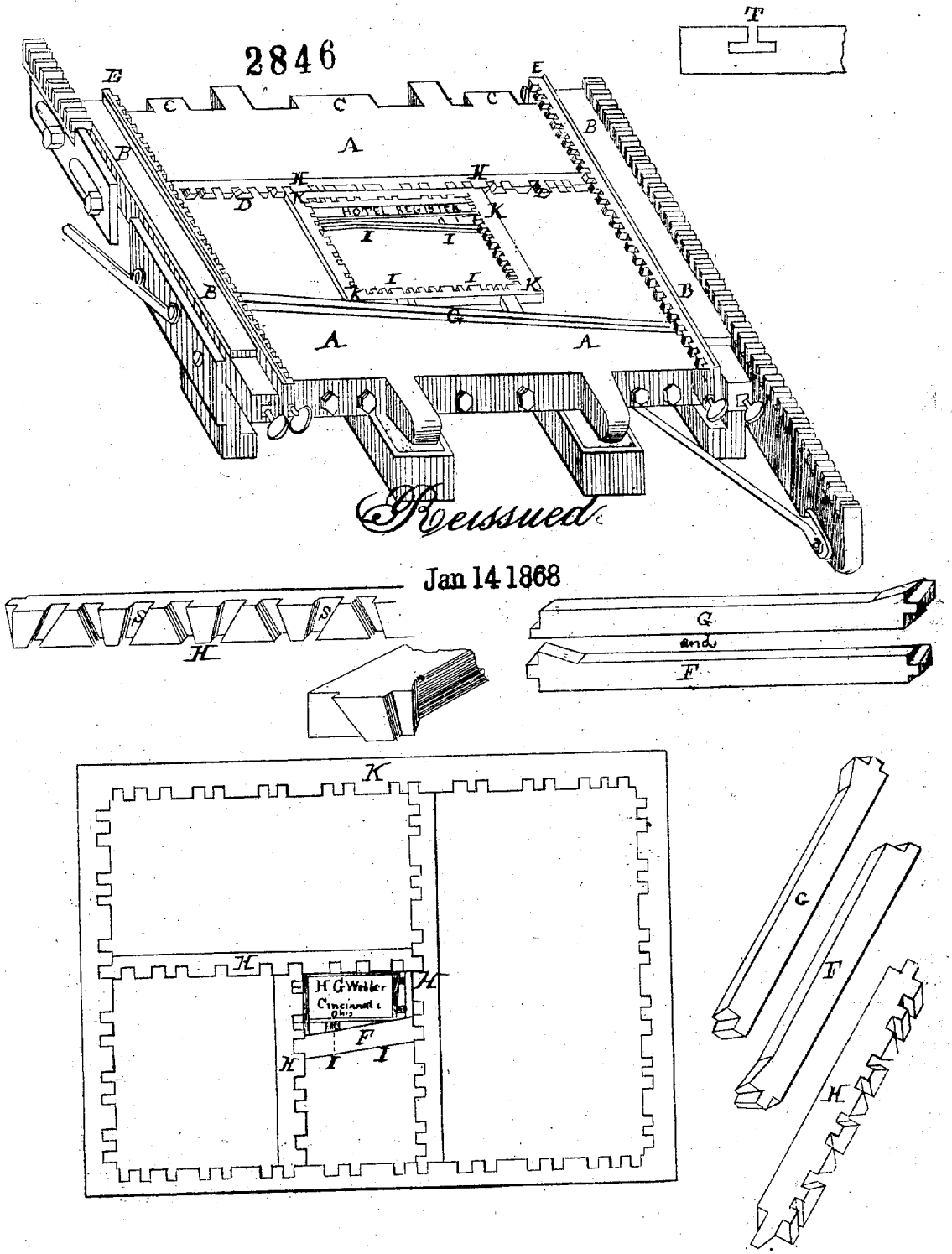

UNITED STATES PATENT OFFICE.

RICHARD YEOMANS, OF CINCINNATI, OHIO.

IMPROVEMENT IN PRINTERS' CHASES.

Specification forming part of Letters Patent No. 50,650, dated October 24, 1865; Reissue No. 2,846, dated January 14, 1868.

*To all whom it may concern:*

Be it known that I, RICHARD YEOMANS, of Cincinnati, in the county of Hamilton, and the State of Ohio, have invented a new and useful contrivance for securely fastening articles requiring a temporary fixedness, called a "Combination Rack;" and I do hereby declare that the following is a full and exact description thereof, reference being had to the accompanying drawings, and to the letters of reference marked thereon.

The nature of my invention consists in transverse notches or grooves made wider and deeper at their upper end, and projecting transverse obtuse edges made on the ends of a bar, or its equivalent, said projecting edges fitting into said notches or grooves as and where required, for the purposes designed. The equivalents of said projecting transverse obtuse edges are projecting points or pins, or perpendicular edges, having notches or grooves made to suit their reception.

To enable others skilled in the art to make and use my invention, I will proceed to describe its construction and operation.

For the more distinct illustration, I have adopted the bed or table of a cylinder printing-press, and a printer's chase—to wit: A shows the bed or table of a cylinder printing-press; B, the bearers; C, the clamps; D, the transverse notches or grooves, shaped as shown at S, which are made at regular distances apart, according to a scale of measurement, and are wider and deeper at their upper end, to prevent the projecting edges on the end of the bar from going lower than is required, and to facilitate their insertion.

Note: In case the equivalent projecting point or pin is used, then the grooves may be made of an uniform width and depth, but their length must be made to accommodate the projections. If a reverse-T form of groove (shown at T) is preferred, then the projecting pin or pointed end would drop down and slide under either end required. When used on a machine where the bar cannot fall through the grooves, a perpendicular groove may be used, (similar to that of ordinary cogs,) the projecting edges being made to correspond and fit. To prevent their expansion when locking up, large chases should have the upper side of the notch or groove dovetailed, with the projecting edges made accordingly.

E represents the strips of metal or other material having the notches or grooves made on the side and corresponding to face each other, running parallel with the bearers B. (This arrangement of the rack is only required when the bearers are not provided with notches.)

F and G are the bevel-bars, having both ends provided with projecting transverse obtuse edges, or their equivalents, which projections must be made to correspond and fit the respective notches or grooves. These bevels are of two kinds—right and left hand—the right hand having its projecting edges on the lower side of the bar at one end, and the upper side of the bar at the other end, the left hand the reverse. This arrangement forms a slant for the quoin or wedge to be driven against in locking up.

H shows a series of combination bars, having both ends provided with projecting transverse obtuse edges, or their equivalents; also having notches or grooves on the one side nearest to you when the said bar is dropped into the grooves sliding from you. The position of the projections on the ends of these bars should be placed so that the space between any two grooved faces will run parallel and measure from grooved face to grooved face the same as the length of a bar for that space, (less the projections.) (See H and K, in drawing.)

Note: The bars may be of any length required, but their grooves and length of bar, less the projections, must be made according to the scale of measurement used for laying off the notches or grooves their regular distances apart.

I is the quoin or wedge for driving up; K, a printer's chase, for inclosing the type or other article to be secured—altogether called a "form"—said chase having notches or grooves on its inner sides, as described by D and shown at S, with cross-bars of various lengths for the purpose of showing the combination, and illustrating the principle shown by D, E, F, G, and H, or their equivalents.

As this invention may be applied to other machinery than the printing-press, other arrangements than the cross-bars will necessarily be required—as, to wit, on the iron-planer, where a bar would not have sufficient strength or weight for the requirements of such a machine, and in some cases would not be convenient.

Illustration of its application on a cylinder printing-press: A is the bed or table, having notches or grooves D on the inner sides of the bearers B, or in the strips of metal E, for the same purpose. Now, the projections of the bars F or G and H are placed to slide into the notches at D or E in opposite directions; thus, H will slide from you, while F or G will slide toward you. The form or other article to be secured is placed against the clamp C, (or against the bar H, dropped into the grooves where the workman may require it,) when F or G is dropped into the groove or notch sliding toward you, and sufficiently near the form for the quoin or wedge I to be put in and driven up.

As a printer's chase: The printer wants to impose a form of type to print a hotel register or account-book heading; size of type, say, thirty by two inches. He has no chase suitable for such a job. He may then take a chase having this rack arrangement—size, say, twenty-six by thirty-four inches—and by dropping a bevel, F or G, into the notches sliding toward the center of the chase and about four inches from one side, it will give him a chase about the size required—viz., thirty-four by four inches.

What I claim as my invention, and desire to secure by Letters Patent, is—

The transverse notches or grooves, in combination with the projecting transverse obtuse edges, specifically as set forth, for the purposes designed.

RICHARD YEOMANS.

Witnesses:
ISAAC C. FALLIS,
WM. DE CHARMS.